Figure 1:
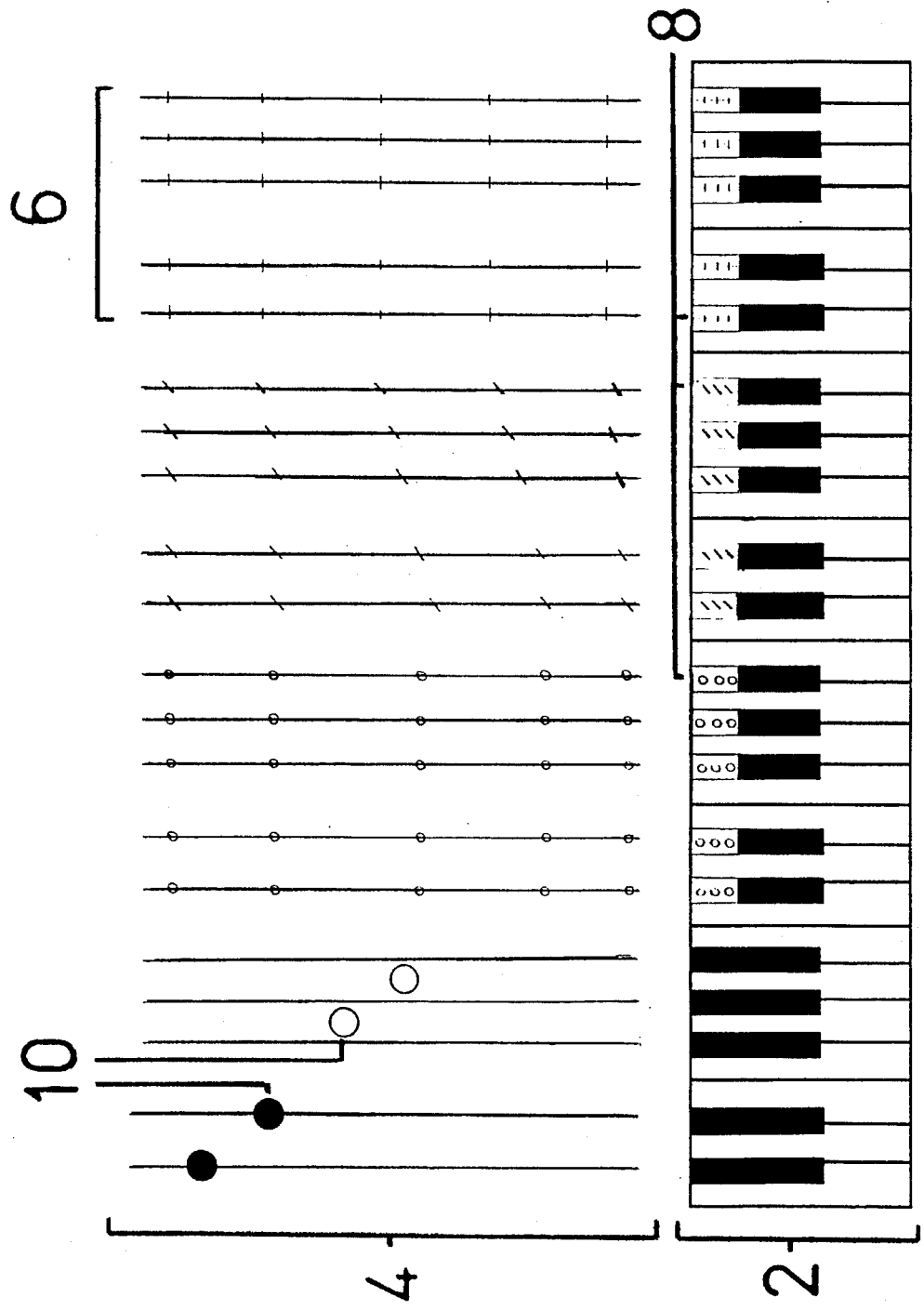

United States Patent [19]
Mencher

[11] Patent Number: 5,574,238
[45] Date of Patent: Nov. 12, 1996

[54] MUSICAL NOTATION FOR KEYBOARD INSTRUMENTS

[76] Inventor: Paul Mencher, P.O. Box 8727, La Jolla, Calif. 92038

[21] Appl. No.: 409,971

[22] Filed: Mar. 24, 1995

[51] Int. Cl.⁶ .................................................. G09B 15/02
[52] U.S. Cl. ............................................ 84/483.2; 84/478
[58] Field of Search .................................. 84/483.2, 428, 84/471, 477 R, 478, 485 R

[56] References Cited

U.S. PATENT DOCUMENTS 1,473,495  11/1923  Miller ........................................ 84/483.2
2,347,950   5/1944  Huish ........................................ 84/478

Primary Examiner—Patrick J. Stanzione

[57] ABSTRACT

A simplified method of musical notation for keyboard instruments to enable easier sight-reading and playing of music. Each octave is represented by five lines (6) of a different color to match the color of tags of the corresponding five black keys of each octave on a keyboard. Each one of these lines represents one of the five half tones or black keys of an octave on a keyboard. Each space on either side of these lines represent the seven whole tone or white keys of an octave on a keyboard.

1 Claim, 1 Drawing Sheet

Musical Notation for Keyboard Instruments

MUSICAL NOTATION FOR KEYBOARD INSTRUMENTS

This patent application is a follow-up of patent application by same inventor Ser. No. 07/847,829 filed Mar. 06, 1992 and abandoned.

BACKGROUND—FIELD OF INVENTION

This invention relates to a method of musical notation for a 12 tone per octave keyboard instrument enabling the sight reader to play with greater facility.

BACKGROUND-DESCRIPTION OF PRIOR ART

The most common musical notation system in use today comprises a five lined staff. Each line and each space of the staff designate a particular musical note or tone. This notation suffers from the following disadvantages:

a) The right and left hands (bass and treble clefs) have different positions for the same notes within an octave and thus require two different interpretations for reading.

b) Sharps and flats associated with music played in different keys require the reader to make further mental transformations thus increasing the possibility for error.

c) The five line staff covers more than one octave. Therefore the position of a note within the staff in one octave is different than the position of the same note in a different octave.

d) Notes on a staff that are played concurrently (chords) are placed on the same vertical line. However, the piano keyboard faces the piano player with its notes in the horizontal plane. This requires a further mental transformation on the part of the sight reader of music.

F. R. Miller's U.S. Pat. No. 1,473,495 describes a system of musical notation with vertical staff lines which are spaced in proportion to and representing the black keys on a piano keyboard. These spaces in between the lines represent the white keys on the keyboard. This notation system suffers from the following disadvantages:

a) The only means of corresponding an octave in the notation to an octave on the keyboard is by referencing a note to the central C# and D# staff lines which are in bold. Thus with notation which is more than two octaves (and which is needed to play most music), in order to determine the octave in which a note is placed, one has to look either to the right or to the left of the bold lines and thereby count or measure the distance from these to a note.

b) With all lines being of the same color and thickness (other than the two center lines) there is a further problem locating a note within an octave when more than two octaves are being represented in the notation. This is because it is hard to see, for notes away from the two center octaves, where octaves begin or end. It is difficult to to determine quickly whether the wider spaces between the lines represent the E and F notes or the B and C notes. Since there is a need to show at least four octaves for music played with two hands, this becomes an important limitation.

OBJECTS AND ADVANTAGES

Accordingly, several objects and advantages of my invention are:

a) To provide a means in the notation for easily recognizing in what octave a note is written.

b) To provide a means in which it is easier to determine whether a note is in the wide spaces between staff lines is a E or F note as opposed to a B or C note.

c) To provide a means of directly correlating an octave in the notation with the actual octave on the keyboard.

DRAWINGS AND FIGURES

FIG. 1 shows four octaves of a twelve tone per octave piano keyboard with the black keys tagged or marked in a different color for each octave (five black keys per octave). FIG. 1 also shows the musical notation of my invention.

REFERENCE NUMERALS IN DRAWINGS

2 Four octaves of a conventional 12 tone per octave keyboard with the black keys tagged or marked in a different color for each octave (five black keys per octave).

4 Notation of my invention

6 5 staff lines of the same color representing the black keys of one octave on the keyboard, with the spaces in between these lines representing the white notes of the same octave on the keyboard.

8 Colored tags or markings on the black keys of the piano keyboard.

10 Notes representing the keys on the keyboard.

DESCRIPTION OF FIGURE 1

FIG. 1 shows four octaves of a 12 tone per octave keyboard 2. The five black keys of each octave are tagged in a different color by means stickers or some equivalent method 8. The notation of my invention 4 comprises five staff lines of a different color for each octave. These five staff lines for each octave also define five interior spaces and two exterior spaces in order to represent the seven white keys for each octave. In addition, the notation consists of notes 10 where notes on a staff line represent black keys, and notes between lines represent white keys. The music is read form top of page to bottom with notes to be played concurrently marked on the same horizontal line. For purposes of this drawing, the notation is shown to be of the same scale as the piano keyboard, where usually the notation would be shrunk proportionally in order to fit on regular sized sheet music.

SUMMARY, RAMIFICATIONS AND SCOPE

Accordingly, the reader will see that the musical notation and colored markers placed on the keyboard will facilitate the sight-reading and playing of music on a keyboard instrument. The novel physical features of the invention provide new and unexpected results from the previous art for the following reasons:

a) By making the five staff lines representing each octave a different color, the reader of music is able to see what octave in which a note is written by simply looking at the color of the nearest staff line. The reader of music therefore does not need to look and see where the note is written in relation to all the other octaves.

b) Furthermore, when the staff lines of each octave are of a different color, one can determine much more easily whether a note written in the wider spaces between staff lines is an E or F note as opposed to a B or C note. This is because the staff lines on each side of the E and F notes are always of the same color while the staff lines on either side of the B and C notes are always of a different color.

c) This invention provides a means for tagging or marking the black keys on the piano keyboard in a different color for each octave corresponding to the color of the staff lines in the notation. This enables the sight-reader of music to easily correlate the octaves in the notation to the octaves on the keyboard.

d) A yet further unexpected result of having colored staff lines in the notation is derived when the notes are of a different color than the staff lines themselves. In the case of, for example, black notes on blue, red or green staff lines, the contrast between notes and staff lines makes the musical notation easier to read.

Although the description above contains many specificities, these should not be construed as limiting the scope of the invention but as merely providing illustrations of the presently preferred embodiments of this invention. Some of the possible ramifications of this invention are:

a) The five parallel lines 6 used to define the 12 tones of an octave could be replaced by any other symbols or marks (in any color) used to define twelve spaces that are spaced roughly proportionally to the finger keys on the keyboard.

b) The notation would normally fit on a regular sized sheet of paper but is not limited to any specific size.

c) Positioning or shape of notes does not need to be precisely as shown in FIG. 1.

d) Notes can be denoted by any mark or symbol including an oval.

e) Any number of octaves may be shown in the notation, and the number of octaves can be further extended by the use of superscript numerals as in conventional music notation.

Therefore, the scope of the invention should be determined by the appended claims and their legal equivalents, rather than by the examples given.

I claim:

1. A color sticker or marking device for each black half tone key of a conventional keyboard instrument, said color sticker being of a different color for each octave, said black half tone keys corresponding to a notation system consisting of a plurality of parallel lines spaced essentially in proportion to, and representing, said black half tone keys, said parallel lines being colored to match the color of said colored stickers of the corresponding black half tone keys, the spaces between said parallel lines representing the white full tone keys.

* * * * *